W. E. HOLDEN.
PIANOFORTE DAMPER.
APPLICATION FILED JULY 24, 1914.
1,184,181.
Patented May 23, 1916.
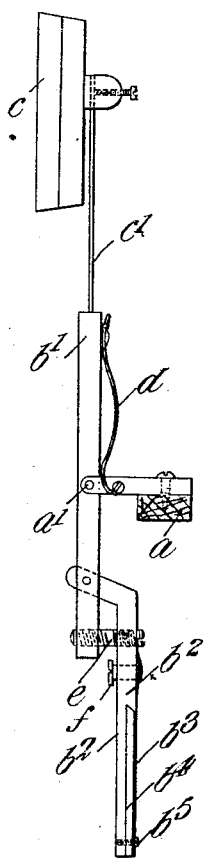
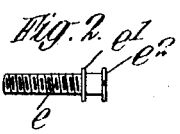
Attest:
E. M. Hamilton
C. E. Parsons
Inventor:
William E. Holden.
by Spear Middleton Donaldson & Spear
Attys.

UNITED STATES PATENT OFFICE.

WILLIAM EWART HOLDEN, OF LONDON, ENGLAND.

PIANOFORTE-DAMPER.

1,184,181.  Specification of Letters Patent.  Patented May 23, 1916.

Application filed July 24, 1914. Serial No. 852,902.

*To all whom it may concern:*

Be it known that I, WILLIAM EWART HOLDEN, a subject of the King of Great Britain, residing at Tavernor's Temperance Hotel, Brunswick Square, in the county of London, England, have invented certain new and useful Improvements in or relating to Pianoforte-Dampers, of which the following is a specification.

This invention relates to pianofortes and particularly to the damper action, the chief object being to provide a more reliable and effective action capable of simple and accurate adjustment without requiring to interfere with the damper spoons as is now the common practice.

The present invention comprises a damper action wherein the felts or heads are permitted to operate under varying conditions and independent, to a certain extent, of the hammer action, the parts carrying the felts being capable of movement in one direction relatively to the damper tails; while adjustable means are provided for enabling each damper to act as a whole unit when required to be actuated by its spoon. Thus by this arrangement the adjustment or bending of the spoons from time to time is entirely obviated.

A further feature consists in providing for the adjustment and renewal of the damper head and tail felts or leathers respectively.

In order that the invention may be clearly understood and readily carried into effect the same will now be described more fully with reference to the accompanying drawing in which:—

Figure 1 illustrates the damper action of a pianoforte constructed according to this invention. Fig. 2 shows a modified detail hereinafter referred to.

According to the invention each damper, which is hinged or pivoted to the damper rail $a$ at $a'$, is made in two parts $b'$ $b^2$, the former carrying the felt or head $c$ and being under the control of the usual damper spring $d$. The lower or free end of the head carrying part $b'$ extends in front of or alongside the other part $b^2$, forming the damper tail which is engaged by the damper spoon (not shown). The damper tail $b^2$ is preferably hinged or pivoted to the part $b'$ and a screw $e$ or the like projecting from the part $b^2$ engages the free end of the part $b'$. The screw $e$ may be formed with a quick thread where it engages with the head carrying part $b'$ and a slow thread where it engages with the tail part $b^2$; or the latter part of the screw may be plain and formed with flanges $e'$, $e^2$, see Fig. 2, which respectively lie against the opposite sides of the damper tail. Thus a slight turning movement of the screw $e$ will enable the free end of the head carrying part $b'$ to be moved or adjusted relatively to the damper tail $b^2$ according to requirements.

In addition to the screw adjusting means above referred to, the damper head $c$ may be detachably secured to its wire $c'$ by a screw or other device adapted to move the felt nearer to or farther from the wire.

In connection with the renewal or adjustment of the leather or felt $b^3$ on the damper rail, the leather may be affixed to a plate, veneer or strip $b^4$ secured at one end by a pin or screw $b^5$ and at its other end engaging a beveled projection formed by rabbeting and under-cutting the damper tail.

While the usual regulating screws $f$ against which the damper lift lever (not shown) bears to lift the damper head felts from the strings will be applied to the parts $b^2$ as shown it is to be understood that they may be applied to the parts $b'$.

With a damper action constructed in accordance with this invention the several parts can each be adjusted or renewed by inexperienced persons and in a minimum of time without requiring to dismount the whole action as is usually the case with arrangements heretofore existing.

What I claim and desire to secure by Letters Patent of the United States is:—

1. A damper action for an upright piano, comprising a lever, a damper head carried by said lever, a damper tail pivoted to the lever, and means for adjusting the head relatively to the tail.

2. A damper action for an upright piano, comprising a lever, a damper head carried thereby, a damper rail for supporting said lever, a damper tail hinged to said lever, a damper spring bearing against the lever and means whereby the tail may be adjusted relatively to the head.

3. A damper action for an upright piano, comprising a two part lever, a head carried by one part, a spring for controlling said part, a damper tail constituted by the other part, a damper rail for supporting said lever, and means interposed between said parts whereby one part may be moved relatively to the other.

4. A damper action for an upright piano, comprising a two part lever, a damper wire carried by one part, a head adjustably secured to the wire, a spring for controlling said part, a damper tail constituted by the other of said parts, a rail for pivotally supporting the head carrying part, means for attaching the damper tail to said part, and means whereby the head may be moved relatively to the damper tail carrying part.

5. A damper action for an upright piano, comprising a two part lever, a damper wire carried by one part, a damper head secured to said wire, a rail for supporting said part, a damper spring engaging said part, a damper tail constituted by the other of said parts hinged to the head carrying part, means interposed between said parts whereby the head may be moved relatively to the damper tail, and a renewable felt adjustably secured to the damper tail.

6. A damper action for an upright piano, comprising a lever in two parts hinged together, a head carried by one of said parts, a damper spring for controlling said head, a damper tail constituted by the other of said parts, a screw engaging the two parts whereby the head may be moved relatively to the damper tail, an adjustable felt carried by the damper tail, and a damper regulating screw attached to said damper tail.

7. An upright pianoforte damper lever comprising a damper-head-carrying part and a tail-felt-carrying part connected so as to permit of relative movement, means for supporting said damper-lever, and means whereby one part may be adjusted relatively to the other part.

In testimony whereof I affix my signature in presence of two witnesses.

WILLIAM EWART HOLDEN.

Witnesses:
T. SELBY WARDLE,
WALTER J. S. PERLEW.

Copies of this patent may be obtained for five cents each, by addressing the "Commissioner of Patents, Washington, D. C."